(No Model.)

D. MUNRO & W. H. AVIS.
SPINNING MACHINE.

No. 475,138. Patented May 17, 1892.

Witnesses
Inventors

UNITED STATES PATENT OFFICE.

DANIEL MUNRO AND WALTER H. AVIS, OF TORONTO, CANADA.

SPINNING-MACHINE.

SPECIFICATION forming part of Letters Patent No. 475,138, dated May 17, 1892.

Application filed February 18, 1891. Serial No. 381,977. (No model.) Patented in Canada April 24, 1891, No. 36,476.

*To all whom it may concern:*

Be it known that we, DANIEL MUNRO and WALTER HERBERT AVIS, subjects of the Queen of Great Britain, residing at the city of Toronto, in the county of York and Province of Ontario, Canada, have jointly invented certain new and useful Improvements in Spinning-Machines, (for which we have obtained Letters Patent in Canada, No. 36,476, dated April 24, 1891,) of which the following is a specification.

Our invention relates particularly to a balling device for spinning-machines for spinning twine; and the object of the invention is to provide a device that will wind the twine directly into balls instead of winding it on bobbins, which are subsequently, by separate mechanism and additional labor, wound into balls, thereby saving this additional labor and time necessary in balling heretofore. We attain this object by means of the mechanism illustrated in the accompanying drawings, in which similar numbers of reference refer to similar parts throughout, and in which—

Figure 1:
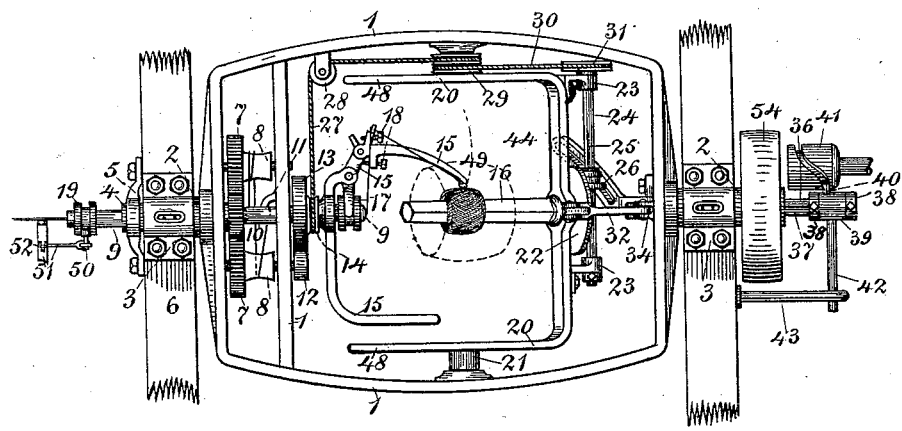
Figure 2:
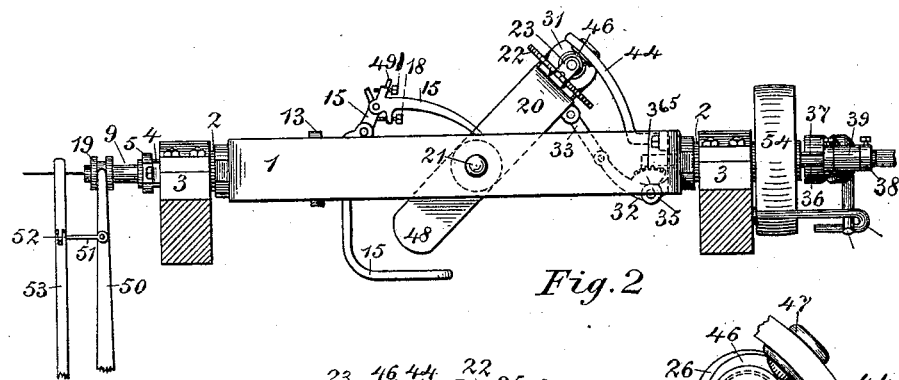
Figure 3:
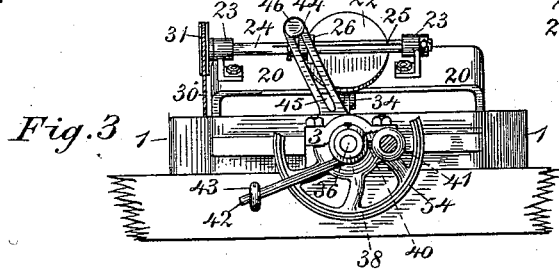
Figure 4:
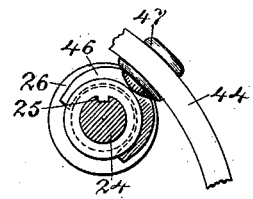

Figure 1 represents a plan of our invention and portions of the frame of a spinning-machine in which it is used. Fig. 2 represents a side elevation of the mechanism illustrated in the foregoing figure, but having the laying-frame at the opposite limit of the arc of vibration and the frame turned over. Fig. 3 represents a right-end elevation of the foregoing figure. Fig. 4 represents a detail, considerably enlarged, of a portion of the shifting arc and the guide operated by the same.

The flier-frame 1 is preferably of metal and may be of the form shown, or rectangular, and having journals 2 at the center of its ends as a means by which it is supported to revolve rapidly in suitable journal-bearings 3 on the frame of the spinning-machine. The length and size of the flier-frame 1 should be similar to that of the bobbin-winding frame in use heretofore, which our invention is intended to substitute and supersede.

The journals 2 are hollow and the journal on the left has a sleeve 4, working inside it and fixed stationary by means of the dog 5 or any other suitable means secured to the supporting-frame, as shown. On the other extremity of the sleeve 4 and inside the flier-frame 1 is a fixed pinion 6, meshing with the wheels 7 of greater diameter than the said pinion 6 and equal to one another, and which are pivoted, as shown in the said flier-frame 1. The wheels 7 have rollers 8 provided on each, over or around which the twine is passed to draw it, as hereinafter referred to. The shaft 9, working within the said sleeve 4, has also a hollow axis, through which the twine passes and is passed out through a diametrical opening or mortise at 10, which also serves as a means whereby this said shaft 9 is secured to revolve in conjunction with the flier-frame 1 by the guide 11, secured on part of the frame 1 and engaging this mortise 10 at one end, as shown, and to a depth slightly less than half the diameter of the shaft 9, so as to allow only of a longitudinal reciprocating movement of the said shaft 9 by the action of the arm. The shaft 9, through the medium of the sleeve 4, guide 11, and mortise 10, is revolved in conjunction with the flier-frame.

On the axle of one of the wheels 7 or of the rollers 8 a pinion 12 is secured to roll on and by frictional contact revolve the wheel 13, carried on the shaft 9 loosely, and to which wheel 13 the pulley 14 and double-jointed arm 15 is secured, the latter to lay the twine around the ball-mandrel 16, hereinafter referred to more particularly. This laying-arm 15 is composed of three parts, jointed together, the second or intermediate piece being provided with a bifurcated extremity to engage a groove in a collar 17, secured fixedly on the extremity of the shaft 9. The third portion of the arm 15 is provided with set-screws 18 on each side thereof as a means of adjusting it to operate the second portion to draw the shaft 9, and thereby operate the stop mechanism by means of the collar 19 on the outer extremity thereof.

When the machine is in operation, the free end of the third portion of the arm 15 is held in contact with the ball on the mandrel 16 by the tension on the twine. The inner set-screw 18 will rest against the second portion of said arm 15 and cause the shaft 9 to be held at the outer extremity of its longitudinal movement at the beginning of the movement. When the ball on the mandrel 16 increases sufficiently, the outer set-screw 18 will engage the corresponding stop on the second portion of said arm 15 and cause the said second portion to draw the shaft 9 inward through the sleeve 4, and thereby operate the stop-lever hereinafter referred to.

About the center of and transverse to the frame 1 a vibrating frame 20 is supported on its axles 21 to vibrate a limited arc of about thirty degrees traverse and terminating at about fifteen degrees and forty-five degrees from the longitudinal axis of the flier-frame 1. At the center of the vibrating frame 20 is journaled the ball-mandrel 16, having a wheel 22 secured on its extremity outside the said frame 20. In suitable bearings 23 on the outside of the frame 20 is carried the shaft 24, having a key-channel 25 therein as a means by which the friction-wheel 26, supported thereon, is caused to revolve with said shaft 24, and at the same time it is reciprocated along the shaft 24 for the purpose of varying the speed of the wheel 22, with which the wheel 26 is maintained in contact.

To revolve the shaft 24, a belt 27 is carried over the pulley 14, thence over idlers 28, secured to the flier-frame 1, and thence over a double pulley 29, carried on one of the axles 21 of the flier-frame 20. From the double pulley 29 a second belt 30 is carried over the pulley 31, fixed on the end of the shaft 24, to revolve the same at any position it may be at in the vibratory traverse given it by the arm 32 and the connecting-bar 33, secured to the said frame 20. To revolve the mandrel 16 reverse to the laying-arm 15, one of the said belts 27 or 30 must be crossed. The arm 32 is pivoted to vibrate in a bearing 34 on the frame 20, and has a toothed segment 35 to engage the rack 365, formed on the extremity of a shaft 36, which, like the shaft 9 at the opposite or front end of the frame 1, occupies the hollow axis of the rear axle 2 of the flier-frame 1, and is secured by a key-channel 37 therein to revolve with the said frame 1 in a manner similar to the said shaft 9, hereinbefore described. The said arm 32 is for the purpose of vibrating the frame 20 to and from the frame 1, and over its traverse from fifteen degrees to forty-five degrees from the plane of said frame 1, thereby laying the twine on the ball at various angles from forty-five degrees to seventy-five degrees from its axis of rotation.

On the outer end of the shaft 36 is secured, between fixed collars 38, a sleeve 39 to allow the shaft 35 to revolve freely within it, and from said sleeve 39 a pin 40 projects to engage a grooved cam 41, carried on another shaft in the spinning-machine and driven by any adapted connection to reciprocate the shaft 36. To maintain the pin 40, engaged with the cam 41, the sleeve 39 is held from revolving with the shaft 36 by the arm 42 on said sleeve 39, engaging a pin or pins 43, secured in the supporting-frame of the machine. To traverse the friction-wheel 26 along the shaft 24 the slotted sector 44 is provided, secured to the frame 1, and inclining outward. In the slot 45 in said sector 44 is provided a guide 46, having a flanged shank 47, sliding along said slot 45. The bifurcated end of this guide 46 engages a groove in the hub of the wheel 26, and thereby operates said wheel 26 to and from the center of the wheel 22, accordingly as the frame 20 vibrates to or from the frame 1, respectively.

The projecting ends 48 of the frame 20 are for the purpose of supporting counterweighting to balance the frame 1 when in motion.

On the outer end of the shaft 9 is secured the grooved collar 19, engaged by a lever 50, to which a pin 51 is connected at one end. At its opposite extremity the said pin 5 engages a hole in the joint 52, and outside the hinged pin of said joint is the stop-lever 53, so that when the ball is completed the lever 53 is brought into action and the machine is stopped.

The flier-frame 1 and the mechanism are operated by a pulley 54 on the rear end axle 2.

The mandrel 16 may have any suitable means for holding the end of the twine on starting to form a ball.

Although we have described our invention as an attachment to a spinning-machine, yet we do not confine ourselves to that particular use, as it is both a spinning and a balling machine and as such can alone be mounted in an adapted frame and employed to spin and ball twine or yarn or ball separately.

In our machine the twine or yarn is intended to be received from a condenser in front, passed through the hollow axis of the shaft 9 till the mortise 10 is reached, thence out and over or around the rollers 8, thence through the remainder of the shaft 9, thence is carried at about right angles to the third portion of the arm 15, where it passes through suitable eyes 491 or over rollers, if desirable, thence through an eye 49 on the free end of said arm 15, and from thence is wound on the mandrel 16 by three motions, first, the revolution of the arm 15 around the mandrel 16; second, by the reverse motion of said mandrel 16 to that of the arm 15, and, third, by the declination of the mandrel 16 and frame 20, (in which it is supported,) slowly vibrating over an arc, as aforesaid.

Having now fully described our invention, what we claim, and desire to secure by Letters Patent, is—

1. In combination, the revolving frame carrying a roller or rollers, a sleeve securely fixed at one end of the main frame and having a wheel on its opposite end connected to operate the roller or rollers carried in the revolving frame and drawing the twine, with the hollow shaft having a mortise and revolving with said sleeve, the guide in the frame to engage said mortise, the jointed laying-arm carried loosely on said shaft, means for actuating the laying-arm, the grooved collar on the end of said shaft, the said collar being engaged by said laying-arm, the stop-lever, and the grooved collar on the opposite end of said shaft to operate the stop-lever, substantially as described.

2. The combination of the main frame, a roller or rollers, the sleeve secured fixedly at one end to the main frame and having a wheel on its opposite end connected to operate said roller or rollers to draw the twine, the laying-frame wheels 7, the hollow shaft having a mortise therethrough and revolving with said sleeve, the mandrel, the guide to engage said mortise in the shaft and revolving the same in conjunction with the frame, the pulley on said shaft, mechanism intermediate said pulley and the wheel on said sleeve, a belt to operate the pulley on the axle of the laying-frame, and a belt and intermediate parts from said pulley on the laying-frame to operate the mandrel, as set forth.

3. The combination, with the flier-frame and the curved sector secured to said frame and having a slot, of the guide, the guide-shank, the wheel 26, its shaft 24, and the vibrating frame, all arranged and operating substantially as set forth.

4. In combination, the flier-frame, the inclining curved sector having a slot therein and secured to the flier-frame, the guide secured in said slot, the friction-wheel having a key therein to engage a channel in the shaft carrying it, the shaft carrying said friction-wheel, the actuating mechanism for the shaft, the fixed sleeve, the pulley on said shaft driven by interposed mechanism specified from the fixed sleeve, and the wheel on the mandrel operated by said friction-wheel, substantially as shown and described.

5. In combination, the vibrating frame, the mandrel journaled therein, the wheel on the end of said mandrel, the friction-roller operating against said wheel and having a key-groove therein, the shaft supporting said roller and having a key journaled therein and supported in bearings on the vibrating frame, the pulley on said shaft, the fixed sleeve, mechanism intermediate the fixed sleeve and pulley, a wheel on the fixed sleeve, and mechanism between said wheel and the shaft, substantially as described.

6. In combination, the revolving frame, toothed sector, and rear hollow journal, the vibrating frame securely journaled in the revolving frame, the connecting-rod attached to the revolving frame, the arm supported to vibrate in the revolving frame and having a toothed sector thereon, the rack on the end of the shaft through the rear hollow journal and engaging said sector, the shaft having the rack thereon at one end, and means on its opposite end to engage a cam, as specified, and the cam provided to operate said shaft reciprocally through said hollow journal, substantially as shown and described.

7. In combination, the revolving frame supported centrally at its ends by hollow journals thereon, the fixed sleeve through one of said journals, the shaft through said fixed sleeve and secured to revolve with the frame, as described, the laying-arm carried on the shaft, means to operate said arm from the fixed sleeve to cause the rotation of the laying-arm about its axis, as specified, a grooved collar on each end of said shaft, whereby the stop-lever is operated, the vibrating frame journaled in the revolving frame, the mandrel operated by prescribed mechanism from the said sleeve, the inclining curved sector to regulate the speed of the mandrel, as described, a pulley on the rear hollow journal to drive the flier-frame, a cam supported to operate the vibrating frame by specified mechanism, and mechanism intermediate the mandrel and sector, substantially as shown and described.

D. MUNRO.
WALTER H. AVIS.

Witnesses:
ALEX. D. CARTWRIGHT,
CHARLES V. GELAND.